(12) United States Patent
Holmen (10) Patent No.: US 7,046,790 B2
(45) Date of Patent: May 16, 2006

(54) SYSTEM, A DEVICE, A COMPUTER PROGRAM PRODUCT AND A METHOD FOR ALLOCATING RESOURCES TO USERS

(75) Inventor: Dick Holmen, Saltsjö-Boo (SE)

(73) Assignee: Q-Wise AB, Lidingo (SE)

( * ) Notice: Subject to any disclaimer, the term of this patent is extended or adjusted under 35 U.S.C. 154(b) by 570 days.

(21) Appl. No.: 10/168,145

(22) PCT Filed: Dec. 15, 2000

(86) PCT No.: PCT/SE00/02549

§ 371 (c)(1),
(2), (4) Date: Aug. 23, 2002

(87) PCT Pub. No.: WO01/45003

PCT Pub. Date: Jun. 21, 2001

(65) Prior Publication Data

US 2003/0039350 A1 Feb. 27, 2003

(30) Foreign Application Priority Data

Dec. 17, 1999 (SE) ............................................. 9904697

(51) Int. Cl.
*H04M 3/523* (2006.01)
*H04Q 3/64* (2006.01)

(52) U.S. Cl. ............................ 379/266.01; 379/265.09; 379/266.06

(58) Field of Classification Search ............ 379/265.01, 379/265.02, 265.03, 265.05, 265.09, 266.01, 379/266.06; 705/8; 709/227
See application file for complete search history.

(56) References Cited

U.S. PATENT DOCUMENTS

| 5,006,983 | A | | 4/1991 | Wayne et al. .................. 705/8 |
| 5,978,770 | A | | 11/1999 | Waytena et al. ............... 705/5 |
| 6,023,681 | A | * | 2/2000 | Whitt ........................... 705/8 |

FOREIGN PATENT DOCUMENTS

| EP | 899673 A | 3/1999 |
| WO | 0052601 A1 | 9/2000 |

\* cited by examiner

*Primary Examiner*—Harry S. Hong
(74) *Attorney, Agent, or Firm*—Nixon & Vanderhye (57) ABSTRACT

The invention relates to a system (100) for allocating service resources to users (20) thereof, which service resources are intended to be provided at at least one service point (10) for service at one or more associated operator positions. The system comprises at least one user terminal (30) arranged for two-way communication with the device (13) via a first and/or a second communication network and at least one device (13) for managing at least one queue and queue information. The first communication network comprises a node for the reception and transmission of messages and the second communication network comprises a server, for example a Web server (18). The invention also relates to the device (13), a computer program, a computer program product and a method.

24 Claims, 5 Drawing Sheets

SYSTEM, A DEVICE, A COMPUTER PROGRAM PRODUCT AND A METHOD FOR ALLOCATING RESOURCES TO USERS

This application is the US national phase of international application PCT/SE00/02549 filed 15 Dec. 2000, which designated the US.

TECHNICAL FIELD

This invention relates to a system, a device, a computer program product and a method for allocating service resources to users of the resources, which service resources are intended to be provided at a service point for serving one or more associated operator positions. In particular, the invention relates to the management of at least one queue and information concerning this, which information, so-called "queue information", can be transmitted to a user.

BACKGROUND

There is often a need to create a queuing system in a simple way at service points, such as banks, post offices, chemists, utilities, travel agencies, delicatessen counters, amusement park attractions, etc, each of which can have several operator positions.

Such systems are well-known and are normally designed in such a way that a customer must first go to the service point in order to obtain a queue number. This is usually carried out by the customer obtaining a queue ticket from some kind of dispenser. A screen, display or the like then shows which queue number is being served and the customer is forced to wait his turn on the premises if he is not to risk losing his place in the queue. In the following, such a conventional arrangement with display and ticket dispenser is called a queue information device.

In order to save time and to be able to carry out other tasks during the waiting time, the customer must thus take a chance on being able to carry out his task and trying to estimate the time until it is his turn. Often this ends up with a new queue ticket having to be taken as the earlier number has already passed, which results in an even longer wait.

In order to avoid this inconvenience, there are, for example, systems where the customer is allocated some form of electronic ticket, for example in the form of a pager which warns the customer in good time, so that his number is not passed before he gets back to the service point. Such a system is described, for example, in U.S. Pat. No. 5,006,983.

A remaining problem is, however, that the customer must still go to the service point to obtain a ticket, even though it is electronic. This means that time and energy are often wasted quite unnecessarily. Associated with this, there is also the problem that the service point must be compatible with the equipment for the electronic ticket.

A further problem is that if the customer has more than one task to carry out, for example in a shopping centre, he must visit several places in order to obtain his queue numbers.

By means of U.S. Pat. No. 5,978,770 a system for allocating and handling queue reservations for dispersed services is already known. A person or a group of persons entering an amusement park are given a user terminal where information about the user is to be entered. The user terminal communicates with a computer for each attraction via a wireless communication network. By means of the user terminal, the user can receive information about queues, in the following called queue information, such as notification messages, estimated waiting time, type of service and means of obtaining a queue number, from the computer for a selected attraction. In this way the user does not need to physically stand in a queue and wait to be admitted to the attraction, but can spend the time on other activities in the amusement park. Although the system is an improvement in comparison with the normal way of physically forming a queue and the system described in U.S. Pat. No. 5,006,983, a person must still go to a particular place in order to be able to take advantage of the system's benefits. In addition the amusement park, for example, must pay the costs associated with the purchase of user terminals, programming of each user terminal, charging the user terminals' energy sources and personnel to issue the user terminals and give instructions about how they work.

BRIEF DESCRIPTION OF THE INVENTION

The object of this invention is to provide a system, a device, a computer program and a method which gives increased freedom to and saves time for a person obtaining service resources, in comparison with the above known technology.

It is also an object of this invention to improve the everyday time-planning for when operator positions are to be visited, for example what day it is most convenient to go to a shop to buy a product.

Another object of this invention is to reduce the costs of a system where the customer obtains a queue number or turn number for service at one or more associated operator positions, without having to visit a service point.

This invention relates to a system for allocating service resources to users of these resources, such as customers, which service resources are intended to be provided at at least one service point for service at one or more associated operator positions, which system comprises:

at least one device, called a "Q-server", for managing at least one queue and information about the queue, queue information, such as notification message, most recently served number, estimated waiting time, number of people waiting, type of service, and means of obtaining a queue number;

at least one user terminal arranged for two-way communication with the device (13);

where the device and the user terminal is connectable to a first communication network, such as a mobile phone network, and a second communication network, such as the Internet, connected together via at least one gateway, where the first network comprises a node, for example a Short Message Service Centre, for the reception and transmission of messages, for example text messages, intended for the device or the user terminal and where the second network comprises a server, for example a Web server, where the device is adapted to communicate with the server and with the node, so that the queue information can be made generally available and can be transmitted to the user terminal via both the first communication network and the second communication network and the device can respond to calls from the user terminal by means of messages, for example text messages. A gateway is defined here as a combination of hardware and software which enables two different types of communication network, such as PLMN (public land mobile network) and the Internet, to communicate with each other by carrying out protocol conversion between the different types of communication network and different applications. By a Web server is meant here a computer communicating with TCP/IP and intended to respond to calls from (Server) clients (users) in the second communication network and to send them the requested information. By means of the system, a person having his own user terminal, such as a mobile phone, is able to obtain queue information and join a queue without going to a particular place to obtain a queue number. Messages can be sent between the device and the user terminal via the node in the first communication network and information, not just queue information, can be obtained from the server. The system takes up a small capacity of the communication network, so-called bandwidth, in applications utilizing small amounts of data per message, or session.

The user terminal is suitably a portable terminal, such as a mobile phone, a PDA (Personal Digital Assistant), a communicator or the like. This means that by using the user terminal a person can join a queue or obtain information about the service associated with the queue regardless of where the person is, provided that he is within the coverage range of the communication network for the portable terminal. A user's user terminal can also easily be used in different countries, thanks to the so-called roaming function which the operators in different countries have, that is the function which permits the user terminal to be moved from one mobile operator to another without the communication being interrupted, and as a result a user of the queuing system can use his user terminal world-wide.

The device in the system is preferably arranged to publish the queue information on a web page on the Internet via the server. By a web page is meant information, including so-called links, intended to show and refer to further information (text, pictures, sound, video) which can be read or retrieved via a graphic user interface, a so-called browser. This means that anyone who has a user terminal which can be connected to the second communication network in the form of the Internet can obtain queue information and decide whether it is worthwhile, with regard to the estimated waiting time, having the service carried out in the near future or whether the person should wait, for example for a few days.

The device is suitably arranged to communicate by means of a WAP server, that is a server which communicates using WAP (Wireless Application Protocol).

It is advantageous if the system comprises a queue information device of the conventional type, for example one which displays queue information and/or a system where a person can be allocated a turn number and obtain a queue ticket. By this means, an exchange of information can take place between the queue information device and the device.

The device and the queue information device are preferably adapted to communicate with each other via a third communication network in the form of a wireless LAN (local area network). By this means, a service point can easily be re-equipped by simply moving the components in the system without relaying any cables. The system is thus also more easily movable.

The device and the user terminal suitably comprise means for communicating directly with each other via the third communication network without the involvement of the first communication network and the second communication network. This means that a greater amount of data can be transferred, as, for example, the Internet and a PLMN normally have a lower transmission speed than a local network. In this way, the communication costs for the service point and the users of the user terminals are kept down.

The invention also concerns a device arranged to manage at least one queue and information about the queue, queue information, such as the most recently served number and number of people waiting, and means of obtaining a queue number. The device is connectable to at least one first communication network, for example a mobile phone network, and a second communication network, for example the Internet, connected together via at least one gateway, where the first network comprises a node, for example a Short Message Service Centre, for the reception and transmission of messages, for example text messages, to and from the device or a user terminal, and where the second network comprises a server, for example a Web server, where the device is adapted to communicate with the server and with the node, so that the queue information can be made generally available and can be transmitted to the user terminal via both the first communication network and the second communication network and the device can respond to calls from the user terminal by means of messages, for example text messages.

The device is suitably arranged to publish queue information on a web page on the Internet via the server.

The device is preferably adapted to communicate with a queue information device, for example one which displays queue information and/or a system where a person can be allocated a turn number and obtain a queue ticket, via a third communication network in the form of a wireless LAN.

In addition, the invention relates to a computer program for use in connection with the device, comprising machine-readable code means for causing the device to manage at least one queue and information about this, queue information. such as most recently served number and number of people waiting, and means of obtaining a queue number and making the queue information generally available and transmitting this to at least one user terminal; and also machine-readable code means to enable the device to communicate with a node, such as a Short Message Service Centre, for the reception and transmission of messages, for example text messages, arranged in a first communication network connected to a second communication network via a gateway, and communicate with a server, for example a Web server, comprised in the second communication network.

The computer program suitably also comprises machine-readable code means for enabling the device to communicate with a queue information device, for example one which displays queue information and/or a system where a person can be allocated a turn number and obtain a queue ticket, via a third communication network in the form of a wireless LAN.

In addition the invention also relates to a computer program product comprising a recording medium which can be read off by a computer, and the abovementioned computer program, where the machine-readable code means for the computer program is recorded on the recording medium.

The invention also relates to a method for allocating service resources to users thereof, which service resources are intended to be provided at a service point for serving one or more associated operator positions, which method comprises the stages of:

from at least one user terminal belonging to a user, calling a device arranged to manage at least one queue and queue information, such as most recently served number, number of people waiting, queue identity, and means of obtaining a queue number, in which a unique terminal identity is given by sending a message, for example via SMS, WAP, UMTS or GPRS, to the effect that it is wished to send queue information to the user terminal with the unique terminal identity;

sending required queue information via a node, such as a Short Message Service Centre, for a reception and transmission of messages, for example text messages, comprised in a first network. and/or via a server, for example a Web server, comprised in a second communication network, which is connected to the first communication network via a gateway, obtaining information for the user terminal about the number currently being served, number of people waiting and queue identity;

accepting a turn number or specifying a desired queue number or a desired estimated waiting time. The information is hereby obtained by means of the user terminal, such as a mobile phone, preferably by using mobile data services, by "ringing" or "linking" (calling up) the service point's Q-server with a unique identity and thereby leaving a message, such as a text message via Short Message Service, SMS, or by using a packet-based radio network system, such as GPRS (General Packet Radio Service, GSM extended by packet data) or obtaining information from the Internet by means of the WAP protocol (Wireless Application Protocol) to the effect that queue information is desired for the mobile terminal with the provided stated identity.

Queue status messages are preferably sent repeatedly to a group which has active electronic queue numbers with the queue identity, that is multicasting. This applies in particular when SMS is not used.

The method also suitably comprises the stage of exchanging information between the device and a queue information device via a third network in the form of a wireless LAN.

It is advantageous if the method comprises the stage of checking a distance between the device and/or the service point and the user terminal with the unique terminal identity.

In a first aspect of the method, it comprises the stages of: checking whether the distance is less than a predetermined distance changing the communication between the device and the user terminal so that it only takes place via the third communication network instead of via the first and the second communication networks when the distance is less than the predetermined distance.

In a second aspect of the method, it comprises the stages of: determining the time when the queue information is to be sent out from the device to the user terminal on the basis of the distance, in such a way that user terminals at a shorter distance from the service point or one of the associated operator positions receive the queue information later than if the distance is longer than the shorter distance.

In order to make it easy for the user to find the right number (identity) of the service point, it is also suitable/possible to connect a catalogue service where information about service points can be found on the Internet on the service point's home-page or at a so-called portal, where the service points to be included are to be found. The business load of the service points could be displayed there and checked when the number or the link is looked up.

In order to make it even more convenient for the users, it is possible to set up a mobile terminal from the above catalogue service on the Internet and from there send the number to the terminal.

Certain functionality is suitably implemented in software, for example the connection to SMSC, Short Message Service Centre, which is an example of a Service Centre/Support Node if SMS is used as carrier for the service.

In addition, the service point will not appear so busy, due to the traffic to the service point being reduced, as it is not necessary to go there to obtain a turn number. The fact of having few customers at the service point means that the service point can provide good service and in addition it reduces the pressure on the personnel.

If a person has several tasks to carry out, it is possible to obtain several turn numbers from different service points at relatively the same time in order to be able to plan a timetable.

It is also possible for the service point to supplement queue information which is sent with other information, for example advertisements.

By a mobile telephone containing a so-called smart card/SIM card, which is personal, information can be used for security purposes (that is to give access) and/or to make preparations for the visit to the service point.

It is also possible to cancel at any point during the whole course of events and thereby relinquish one's place in the queue.

Further developments and special features of the invention concept are apparent from the following description.

DESCRIPTION OF THE FIGURES

The invention is described in greater detail below in the form of examples, with reference to the attached figures, in which.

DETAILED DESCRIPTION OF EMBODIMENTS OF THE INVENTION

Figure 1:
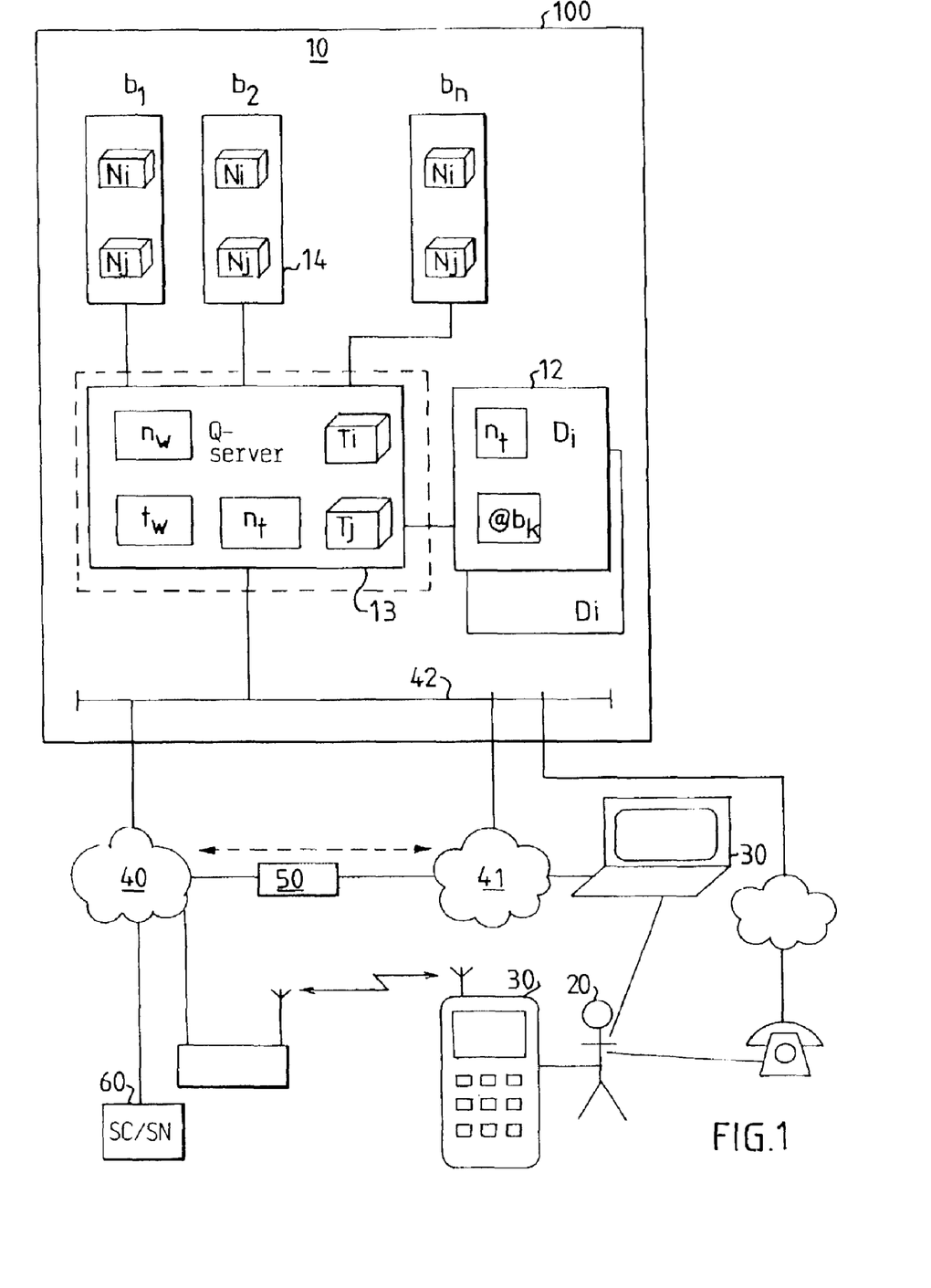
FIG. 1 shows a diagrammatic view of a system according to the invention, which comprises a Q-server.

FIG. 1 shows a diagrammatic view of an embodiment of a system 100 according to the invention. One or more user terminals 30, which can belong to one and the same user 20 or different users, are connected via a first communication network 40 in the form of a mobile telecommunications network (PLMN) and a second communication network 41 in the form of the Internet, to a device 13, in the following called "Q-server", arranged to manage at least one queue, and information about this, in the following called "queue information", which for example comprises: notification messages, most recently served number, estimated waiting time, number of people waiting, type of service, queue identity and means of obtaining a queue number. Between the Q-server 13 and the communication networks 40 and 41 at least one third communication network 42 can be provided. The third network can be a normal LAN and is therefore not described in greater detail here, but a second embodiment of the third communication network 43 is described in connection with FIG. 9.

The Q-server 13 can in turn be connected to a queue information device 12 of conventional type, which displays queue information, such as the relevant queue number, $n_j$, the number of the operator position, $b_j$. The queue information device 12 can, for example, be constructed as a display screen.

The communication networks 40 and 41 are connected together via a gateway 50. The mobile telecommunications network suitably comprises the mobile data functionality.

The mobile telecommunications network can, for example, be a GSM network (General System Mobile), comprising message services, such as Short Message Service (SMS). This is shown in the figure by a Service Centre/Support Node (SC/SN) 60 being connected to one communication network 40. Of course several SC/SN 60 or other units for message handling can be connected.

A second example is to use a so-called packet-switched mobile data service over radio as carrier of the messages, such as text messages, sound messages and graphic messages such as pictures and video sequences. One such could be GPRS (General Packet Radio Service) which can/will be able to be used in the GSM system. This GSM network has support as per SC/SN 60 for routing of packets and maintaining sessions, and also for charging functions. This also requires the mobile terminals to be arranged for packet-switched data traffic.

A packet-switched communication system differs from a so-called circuit-switched communication system in that the information is sent in packets only when there is any data to be sent, and between these packets nothing is sent, as this data (the information) is usually intermittent. These packets usually also contain the identities of the communicating parties (source and destination addresses).

A circuit-switched communication system is connected between the communicating parties the whole time; this technology is usual when it is a question of a normal telephone call, when speech and sound are continuous in character.

A difference between SMS and GPRS is that SMS is only a one-way message and information about who sent the message must be included in the message itself. In order to utilize SMS in the invention, the communicating parties must thus add their identity, the source address, as the whole method requires a sequence of messages which belong together, a so-called "session".

SMS cannot guarantee a maximum for delays in the network, however messages can be given different priorities. An alternative to high priority is that the Q-server can take time measurements, for example for user terminals and/or a reference (Q-)server, in order to estimate the delays in the network, and use this information when turn numbers are allocated and/or notification messages are sent. In GPRS the maximum delays are specified and very small.

In GPRS the system keeps track of the identities (source addresses) of the respective communicating parties, support is thus built-in for managing a session when the parties connect.

A third example is to utilize, for example, the WAP protocol, which makes it possible for information on, for example, the Internet to be retrieved to a mobile terminal, provided that this is a so-called "WAP mobile terminal". The WAP protocol can use several different carrier services in order to exchange information, for example both SMS and GPRS.

A fourth example is the use of other wireless telephone systems, improvements on old wireless telephone systems, or a combination of these. Examples of alternative standard systems are UMTS (Universal Mobile Telecommunication System), EDGE (Enhanced Data rates for Global Evolution), HSCSD (High Speed Circuit Switched Data) and i-Mode.

The system can also be integrated with existing "manual" queuing systems, where a customer first must go to a service point 10 in order to obtain a queue ticket. The queue information device 12 suitably comprises a part, that is the display screen, of such an existing "manual" queuing system. As the function of such a part is well known, it is not described here in greater detail.

Other conventional components in queuing systems are connected to the Q-server 13, such as queue number keys 14, at the respective operator positions, by means of which, for example, the cashier can advance the next turn number. Nor will these be described in greater detail here, as their function is well known.

The Q-server 13 comprises at least the functions: take turn number, T (and a key if the system is integrated with a conventional queuing system) and the current number $n_j$, and any estimated waiting time $t_w$ and the number of people waiting $n_w$. How these functions are implemented and how they operate will be described in greater detail below, with reference to FIG. 2, which is a detailed view of an embodiment of the Q-server 13. The broken line in FIG. 1 shows where the view in FIG. 2 was taken from.

Figure 2:
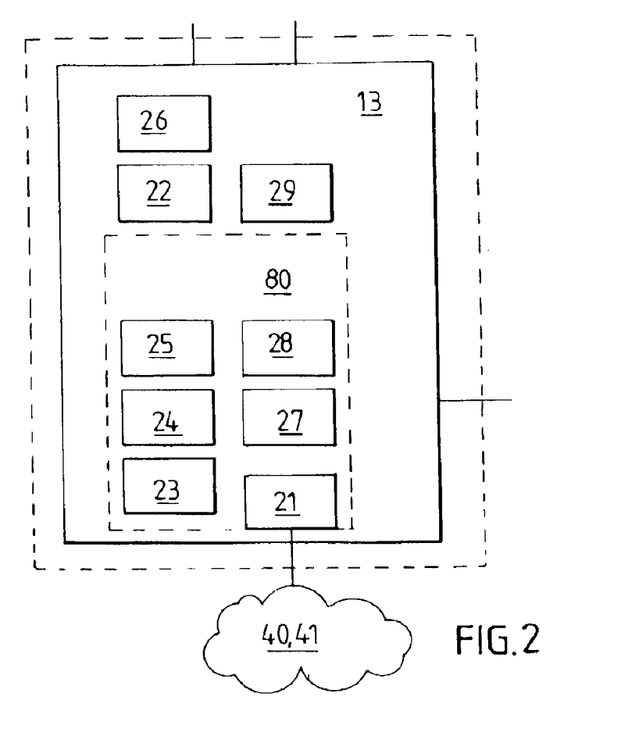
FIG. 2 shows an enlarged view of an embodiment of the Q-server which is shown in FIG. 1.

The Q-server 13 comprises a first data port 21 for communication with at least one user 20 via at least one of the two communication networks 40 and 41, for example if WAP is used the communication takes place via both the mobile telecommunications network and the Internet. This is carried out by user terminals 30 being connected to the communication networks 40, 41. In addition there is a device 22 for setting one of at least two operating modes. There are suitably at least three operating modes.

The device 22 for setting the operating mode is suitably implemented by means of the software in conjunction with microprocessors in the Q-server 13 and the user terminal 30. The function is explained below.

A first operating mode is so arranged that a user 20, via a user terminal 30, can take a turn number. For this the Q-server 13 is provided with a call module 23 and device 24 for handling the method for dealing with requests for turn numbers. In addition there is a device 25 for checking the queue status and a device 26 for sending information to the relevant user terminal 30. There is also a device for receiving and this can, for example, be combined with the device for transmitting 26. In addition there is a device 27 for recording queue identity, reserving turn number and any estimated waiting time. A second operating mode is used later for "monitoring the place in the queue". For this there is a calculation device 28 which notes when the required message is to be sent and places the user terminal in the correct message list. There can also be a device 29 for "printing out and sending acknowledgements". The interaction of the various devices is described with the help of the function of the different operating modes, which is described below.

The function of the different operation modes will be described in greater detail below, but first reference is made to FIG. 3, which is a sequence diagram for an overall method according to an embodiment of the invention which will be described in greater detail below. In parallel, reference is also made to FIG. 1 for the reference numbers.

Figure 3:
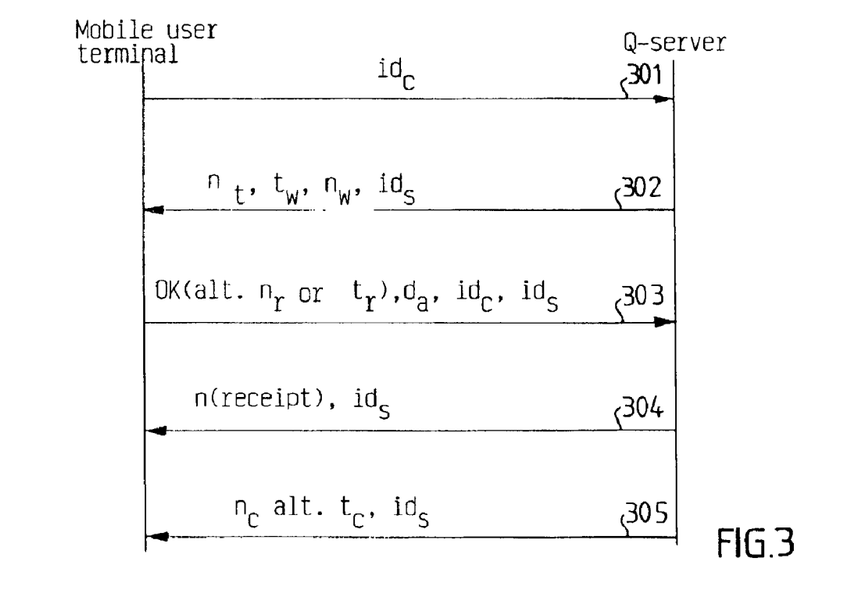
FIG. 3 shows a sequence diagram of an embodiment of the method according to the invention.

Communication between user terminal and Q-server:

The sequence diagram in FIG. 3 shows a sequence between a user terminal 30, in this case a mobile terminal, and the Q-server 13. The reference direction is from the mobile terminal to the Q-server. Five stages are shown.

It is also possible for the user to cancel and terminate the whole sequence. It is assumed that this can be carried out at any time during the session (in the sequence of messages). This will be described in connection with a finite state machine where the flow chart is explained and with reference to FIG. 7.

Similarly, it can be the case that a time measurement must be carried out between each message in order for the Q-server not to wait indefinitely for a message in the sequence. Then if the time expires, the Q-server can consider that the call has been terminated and thereby remove the terminal's data from the system. However, this will not be described here.

In a first stage, 301, the service point's 10 Q-server 13 is "called" from the mobile terminal 30, and a unique terminal/user identity $id_c$ is given. By "call" is meant to ring or be connected and thereby leave a message, using for example SMS or GPRS as carrier of the messages, to the effect that information (about the queue) is required to be transferred to the mobile terminal 30 with the identity $id_c$.

The stage where a user 20 of the terminal 30 activates and accepts that the identity, that is "the number" (source address), is sent is not shown, but is assumed to have been carried out, otherwise the identity has to be entered manually in the message if SMS is used.

In a second stage, 302, information is obtained from the Q-server 13 concerning the relevant served number $n_t$, the queue identity $id_s$ and any estimated waiting time $t_w$ and number of people waiting $n_w$ for all queues internally, that is the different types of service which are available at the relevant service point 10.

In a third stage, 303, the next turn number is accepted for at least one of the queues by the user of the mobile terminal, or alternatively the required queue number $n_r$ or required calculated waiting time $t_r$ is stated. In addition it is possible to obtain a notification message of standard type which can be pre-defined, for example specifying that the message to the effect that the turn number is getting close should be sent when the number ten before is served.

Alternatively, the required difference between accepted/stated queue number $d_a$ is specified for the notification message.

In a fourth stage, 304, the turn number obtained is accepted together with information about which queue it concerns and is retained as an acknowledgement.

In a fifth stage, 305, a notification message is then sent from the Q-server 13 to the user terminal 30 with the queue identity $id_s$, to the effect that the user's queue number $n_c$ or the time $t_c$ is approaching, when such is the case.

It is also possible to let the Q-server send queue status messages repeatedly, that is after each new number is advanced for service, to a group which has active electronic queue numbers with the queue identity $id_s$, so-called multicasting. By multicasting is meant in general that a particular group ("multi-") receive messages sent ("-casting"). In this case, it means that all those who to date have taken a turn number by mobile means in this particular queue receive a message for each number which is advanced for service.

An additional alternative is that the customer can book a time at a service point by means of his mobile terminal. In order for the time to be as close to the required time as possible, no turn number is taken out until the booked time approaches. The business load of a service point 10 varies and the turn number is only sent when the waiting time can be estimated sufficiently accurately in accordance with a predefined method of conventional type and is therefore not described in greater detail.

If only one notification message has been selected, the sequence is terminated.

Figure 4:
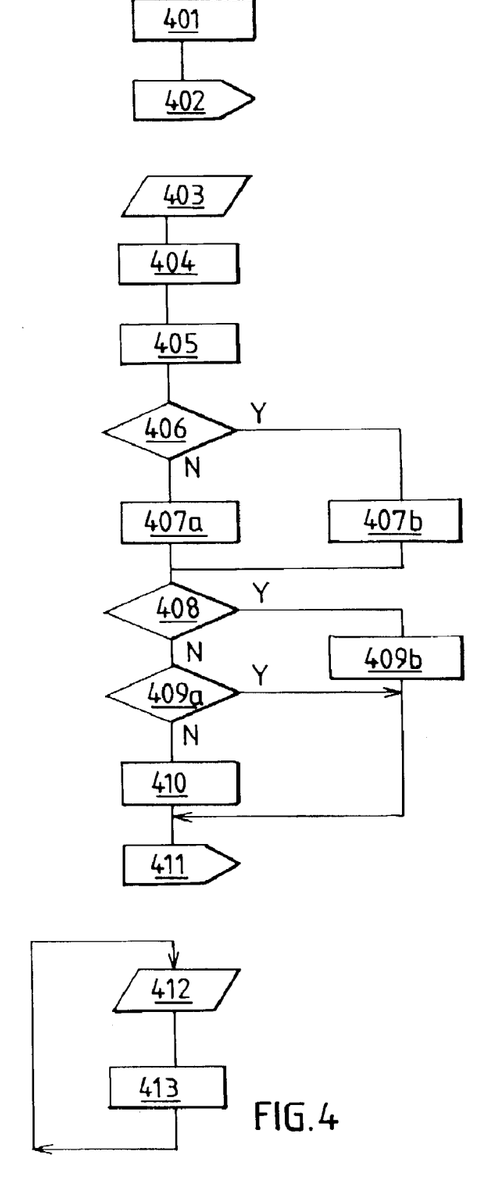
FIG. 4 shows a flow chart which describes the function of a user terminal, in this case a mobile terminal.

User terminal:

The function of the abovementioned first operating mode is described by means of a flow chart which is shown in FIG. 4.

In each stage when information is sent between terminal and server it is assumed that the terminal identity and queue identity (source addresses) are known to each other. If this is not the case, then they must be added. This is in order to maintain a connection, a so-called "session", in order that the messages will reach the correct individuals in the system.

In a first stage, 401, the address of the service point 10/telephone number of the user 20 is entered. This can be carried out, for example, by dialing a telephone number on a mobile terminal 30.

In a second stage, 402, the service point 10 is called, and a source address is also given, that is the user's address $id_c$ of the mobile terminal 30, in order to be able to maintain the session.

In a third stage, 403, information is awaited/obtained from the service point's 10 Q-server 13.

In a fourth stage, 404, the information is displayed, that is the relevant served number and queue identity, any estimated waiting time and number of people waiting, for each type of service or queue at this service point 10.

In a fifth stage, 405, the type of queue or service is selected (if there are more than one).

In a sixth stage, 406, there is an acceptance or refusal to take the next turn number for the selected queue.

If YES, in a seventh stage, 407b, it is noted/marked that the next turn number is required.

If NO, in a seventh stage, 407a, the required turn number or required time is entered on the mobile terminal.

In a subsequent stage, 408, it is selected whether continuous queue status is required (multicasting), that is an indication is given for every number which is advanced.

If YES, then it is noted/marked that continuous queue status is required, stage 409b, then go to stage 411.

If NO, state in stage 409a whether a standard notification message (for example ten numbers before) is required.

If YES, go to stage 411.

If NO, state in stage 410 when a notification message is to be sent (number of numbers before).

In stage 411, the information entered during the earlier stages is sent to the Q-server.

In a subsequent stage, 412, the system waits and an acknowledgement or notification message is received.

In stage 413, this is displayed and can be saved (stored in the memory), after which the user/terminal is once again ready to receive a notification message in stage 412 or to start again from stage 401.

The user of the terminal can keep track of where he or she is in the sequence himself or herself, by first only sending a request for queue information, obtaining this and then making a choice concerning the required turn number. Thereafter only one or possibly several notification messages will be received by the terminal.

Although a mobile terminal was described above, the invention is not limited to such. The user terminal can instead, for example, be a computer or the like, which, for example, can be connected via the Internet. An ordinary telephone over the ordinary telecommunications network would also be able to be used.

Figure 5:
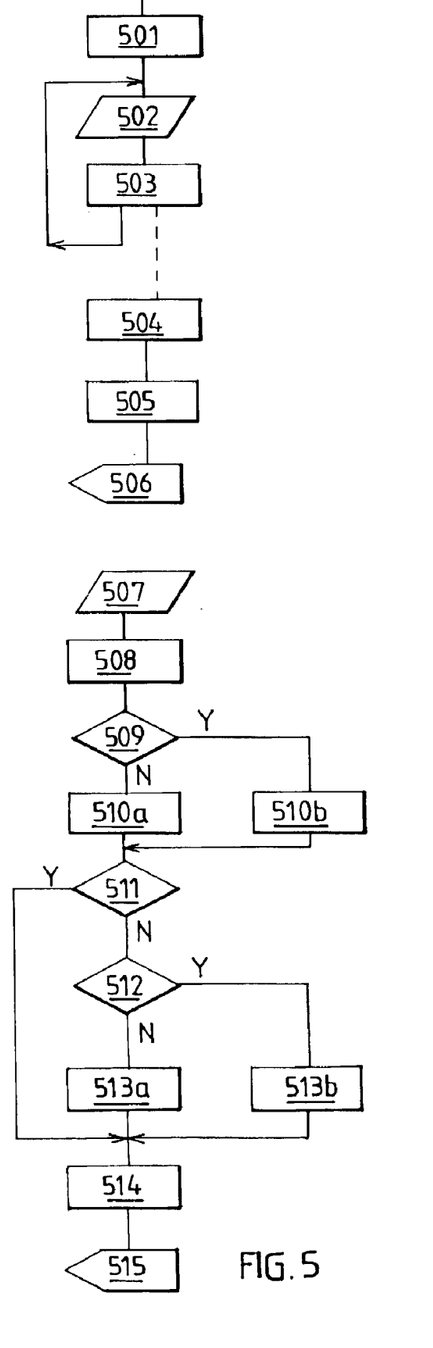
FIG. 5 shows a flow chart which describes the function of the Q-server, when a turn number is requested.

FIG. 5 shows how the turn number request of the Q-server is carried out in the abovementioned first operating mode.

Q-server (first operating mode—turn number request):

In a first stage, 501, the call module 23 is initiated.

In a second stage, 502, a request for turn number via the communication network is awaited. Device 26 is used to receive.

In a third stage, 503, an individual data entry is created for the method which handles the request for terminal with its identity. This is carried out using device 24 to implement the method for handling requests for turn number At the same time, any calls are awaited from terminals for requests for additional turn numbers in stage 502. This is carried out in the same way in other operating modes.

In a subsequent stage, 504, data is initiated for turn number requests.

In stage 505, the status of all types of queue is checked. This is carried out using device 25 for checking queue status.

In stage 506, information is sent to the relevant user station 30, using device 26.

In stage 507, the user's choice of queue (type of service), required turn number or required time, or whether the user accepts the next relevant queue number (when the message arrives at the Q-server) and choice of required notification message are awaited.

In stage 508, a turn number is reserved using device 27 to record the queue identity, reserve the turn number and, if required, estimate the waiting time.

In a subsequent stage, 509, the next turn number is accepted or rejected.

If YES, stage 510b, take next turn number, which is suitably carried out in association with any existing conventional queuing system.

If NO, stage 510a, reserve a turn number. If the user requires a particular time, the appropriate turn number can be estimated (possibly in association with an existing conventional queuing system).

In a subsequent stage, 511, a standard notification message is accepted or rejected.

If YES, go to stage 514.

If NO, stage 512, whether continual queue status is required is accepted or rejected.

If YES, stage 513b, mark for continual queue status (multicasting).

If NO, stage 513a, note when (difference in turn number) the required message is to be sent.

In stage 514, the user terminal's identity (the individual) is placed in the correct message list, that is for the correct type of service.

In stage 515, an "acknowledgement" is sent with associated queue identity for the turn number obtained. This is carried out by device 29 for "printing out and sending acknowledgements".

Figure 6:
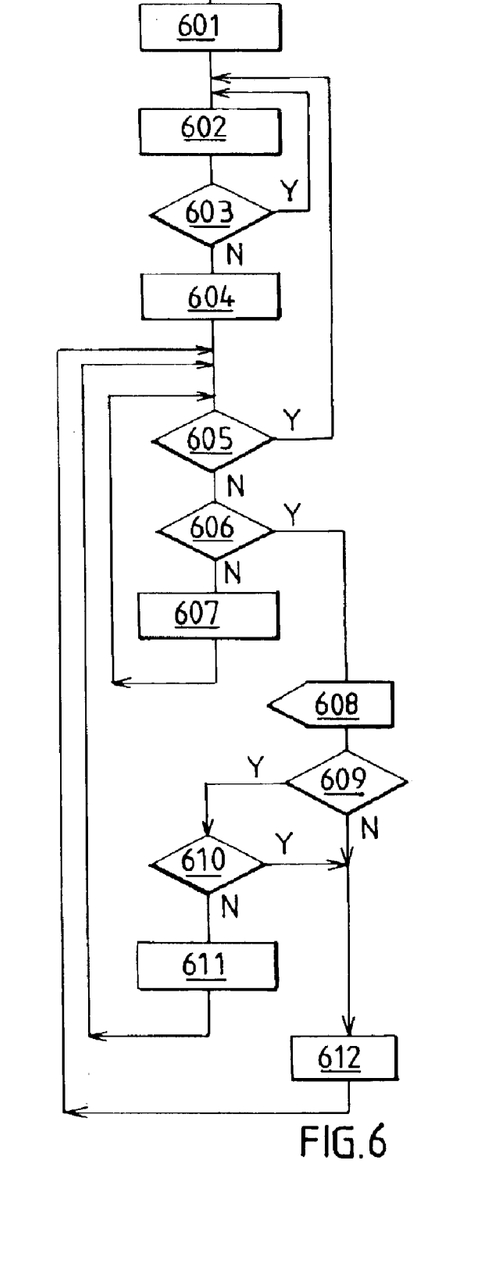
FIG. 6 shows a flow chart which describes the function of the Q-server, when handling messages.

FIG. 6 now shows how message handling is carried out in the abovementioned second operating mode.

Q-server (second operating mode—message handling):

All the stages except 608 can be carried out by means of device 28.

In a first stage, 601, data and the message list are initiated to be empty for one type of queue. The method can handle one type of service (or queue). There can therefore be several identical second operating modes if there are several types of service.

In a second stage, 602, new customer for service, that is turn number is advanced.

In a third stage, 603, the system checks that the message list is empty. As long as it is empty there is no reason to do anything.

If YES, go back to stage 602 and await next calculation of turn number.

If NO, stage 604, take the first user in the message list for subsequent processing.

In a following stage, 605, it is determined whether the whole message list has been checked.

If YES, return to stage 602 and await next turn number calculation.

If NO, in stage 606, it is determined whether a notification message is to be sent to this user.

This can be carried out by comparing the difference between the current served number and this user's turn number with the difference for the notification message.

If NO, stage 607, take the next user in the message list, then repeat from stage 605.

If YES, go to stage 608, where a message is sent to this user, using device 26.

The message contains the relevant served number and queue identity.

In stage 609, it is checked whether this terminal, that is individual, has continual queue status.

If NO, go to stage 612.

If YES, stage 640, it is checked whether this individual's turn number is the same as the turn number which is to be served.

If YES, go to stage 612.

If NO, stage 611, take the next user in the message list, then go to stage 605.

In stage 612, this user is removed from the message list, then repeat from stage 605.

Figure 7:
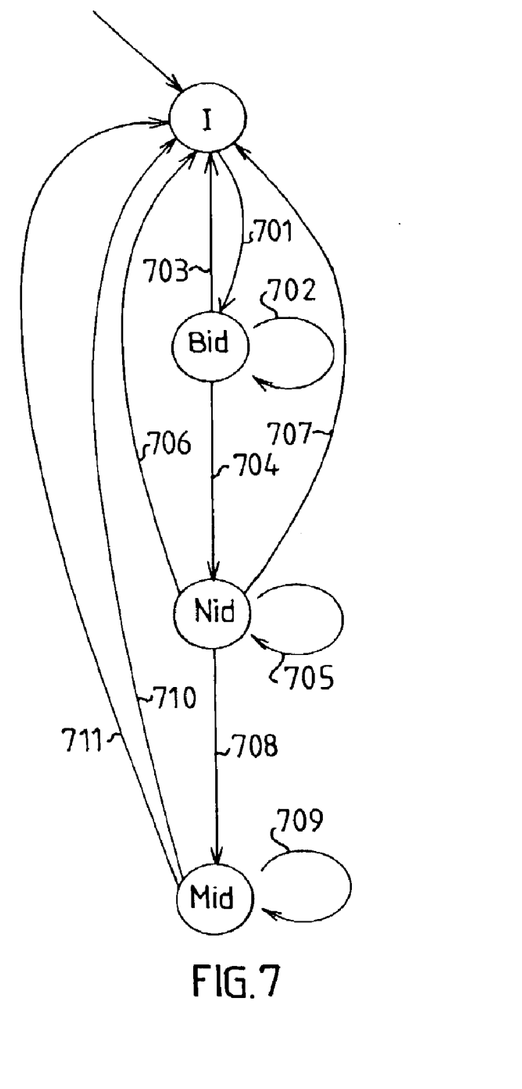
FIG. 7 shows a finite state machine which describes the function of the Q-server.

Finite state machine:

FIG. 7 shows a finite state machine for a terminal user in the Q-server.

In order to describe the Q-server further, it is shown how a so-called "finite state machine" can be used to remember where in the sequence the Q-server is. For several users the same number of finite state machines are required as there are currently users in the system. These can be implemented in the Q-server in its read- and write-memory for data with a state variable for each individual.

In FIG. 7, each arrow represents a transition from the current state to the next state and each circle represents a state, where for each individual finite state machine there are three states.

The Q-server is assumed to be in an initial state, I, where it has been started and has created and initiated data structures for its further functioning.

The transition, 701, from I to Bid is initiated by the event: request for turn number from terminal $id_c$.

The action is: initiate and create data for user $id_c$, take queue information and send it to user terminal $id_c$.

The transition, 702, from Bid back to Bid is initiated by the event: turn number is advanced. The action is: none.

The transition, 703, from Bid to I is initiated by the event: user terminal $id_c$ terminates.

The action is: (remove data for individual $id_c$, this applies to all transitions to state I).

The transition, 704, from Bid to Nid is initiated by the event: choice arrives from user terminal $id_c$. The action is: calculate and allocate turn number, send this as acknowledgement and place user identity $id_c$ in the correct message list.

The transition, 705, from Nid back to Nid is initiated by the event: turn number is advanced AND the fact that the conditions: served number has not reached the number when the notification message is to be sent AND user $id_c$ has not chosen continual queue status are fulfilled. The action is: None.

The transition, 706, from Nid to I is initiated by the event: user terminal $id_c$ terminates. The action is: remove user $id_c$ from the message list.

The transition, 707, from Nid is initiated by the event: turn number is advanced AND the fact that the conditions: served number has reached the number when the notification message is to be sent AND user $id_c$ has not chosen continual queue status are fulfilled. The action is: remove user $id_c$ from the message list and send notification message to user terminal $id_c$.

The transition, 708, from Nid to Mid is initiated by the event: turn number is advanced AND the fact that the conditions: user $id_c$ has selected continual queue status AND served number is different from turn number for user $id_c$ are fulfilled. The action is: send notification message to user terminal $id_c$.

The transition, 709, from Mid back to Mid is initiated by the event: turn number is advanced AND the fact that the conditions: user $id_c$ has chosen continual queue status AND served number is different from turn number for user $id_c$ are fulfilled. The action is: send notification message to user terminal $id_c$.

The transition, 710, from Mid to I is initiated by the event: user terminal $id_c$ terminates. The action is: remove user $id_c$ from the message list.

The transition, 711, from Mid to I is initiated by the event: turn number is advanced AND the fact that the conditions: user $id_c$ has chosen continual queue status AND the served number is the same as the turn number for user $id_c$ are fulfilled. The action is: send last notification message to user terminal $id_c$ and remove user $id_c$ from the message list.

Figure 8:
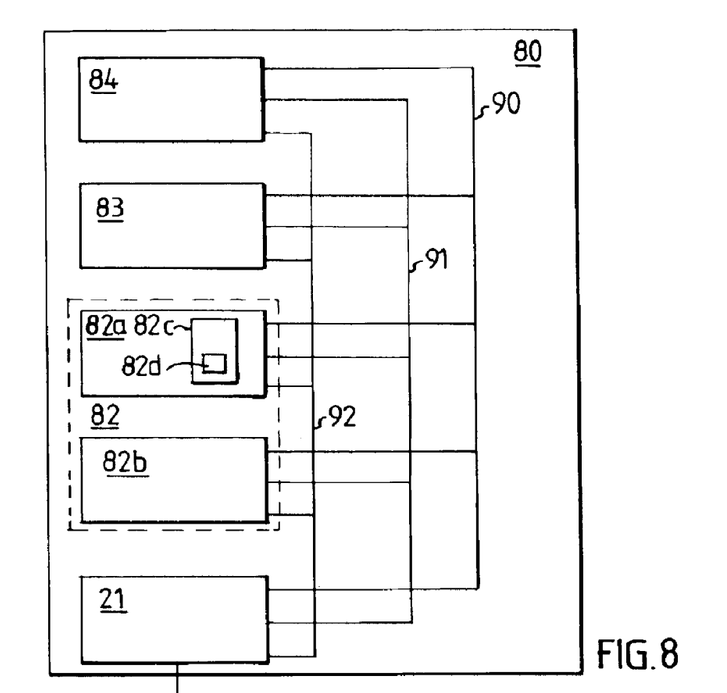
FIG. 8 shows a computer, which is arranged in or connected to the Q-server.

FIG. 8 shows unit 80.

The devices 23–25, 27 and 28 are implemented suitably by being contained in a unit 80 which in turn comprises a program and data memory 82a–b, a processor unit 83, a time circuit 84 and at least one input/output device (data port) for communication with the outside world, which are connected to each other in a conventional way by address bus 90, data bus 91 and control bus 92. This will therefore not be described in greater detail.

The program memory in turn comprises a storage medium 82c and machine-readable code 82d stored on the storage medium 82c, to cause the unit 80 to carry out required stages, that is as described in FIGS. 4, 5 and 6.

Figure 9:
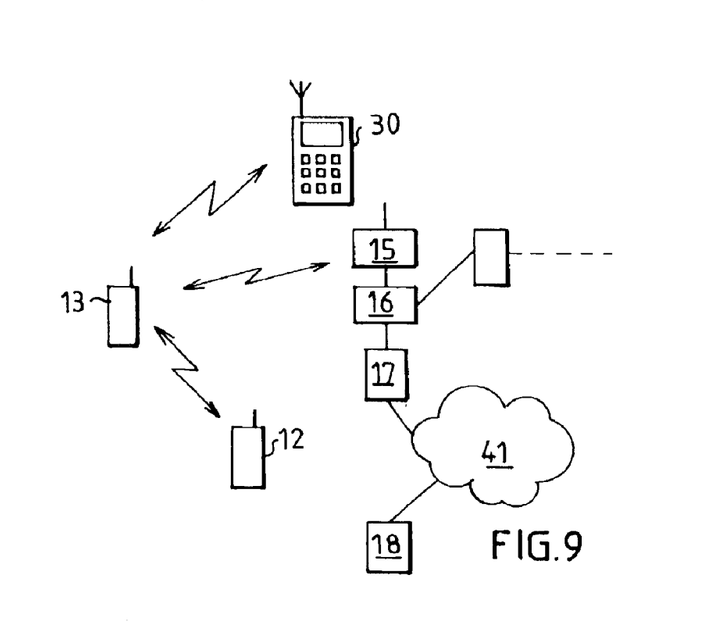
FIG. 9 shows a second embodiment of part of the system.

FIG. 9 illustrates an alternative embodiment of a third communication network 42, which has a local wireless network, such as a wireless LAN or a WPAN (Wireless Personal Area Network) for smaller service points or operator positions. Both the queue information device 12 and the Q-server 13 are provided with devices for receiving and transmitting information via an antenna each. An access device 15, provided with an antenna, incorporated in a LAN, which in turn is connected to the Internet via an Ethernet hub 16 and a conventional firewall 17, enables the Q-server 13 to communicate with the user terminal 30 via the Internet. The user terminal can also comprise devices, such as a modem for wireless information incorporated in a PC card or the like, for two-way communication in the local wireless network, which means that the Q-server 13 can communicate directly with the user terminal if the user terminal is within the radio range of the local wireless network. In this way, communication between the Q-server and the portable user terminal 30 can change from taking place via the Internet and mobile phone system to the local wireless network, in order to increase the communication speed and reduce the communication costs. FIG. 9 also illustrates a server in the form of a Web server 18, which is connected to the Internet and via which the Q-server 13 can publish queue information on a generally available home-page on the Internet. Alternatively, the Q-server can act as a Web server in addition to or instead of the Web server 18.

When the Q-server, or some detection device connected to the Q-server, identifies that the customer/user terminal 30 with its identity determined through the already described connection method, is on the move, a signal can be sent to precisely this customer at regular intervals until the customer is within the range of the local wireless network and contact can be made. This saves energy, for example battery capacity in the user terminal, as the transmission is carried out centrally from the service point 10.

Alternatively, the user terminal can automatically start a connection directly with the local wireless network when the user terminal is already within the range of the local wireless network. For this the Q-server 13 comprises a computer program stored on the storage medium 82c, which computer program causes the Q-server to detect general local calls.

Systems for wireless LAN or WPAN can be, for example, Proxims Open Air, Bluetooth, HomeRF or some system in accordance with the IEEE 802.11 standard.

Positioning of the portable user terminal 30 can be used in order to find service points in the vicinity for a required service in a simple way. This can be carried out by a mobile phone operator taking a bearing on the user terminal 30 from one or more radio base stations. The mobile terminal can also comprise a built-in GPS transceiver, which can send its position to the mobile phone operator. The position is then sent on to the Q-server 13 to be combined with a catalogue service.

The positioning information can also be used to determine the time when the notification signal is to be sent out to the customer. If the customer is close, it can be sent later and if the customer is located further away, it can be sent earlier.

The positioning system can also be used in association with connection to the service point 10 and transition to local radio communication to determine when/if the customer is within the local wireless network.

In order to simplify the exchange of information between the Q-server 13 and the user in accordance with, for example, the methods which are described in connection with FIGS. 3–6, the exchange of information can be carried out by the user terminal 30 being controlled at least partially by the user's voice. For example, a user can say "Queue, post office, Street 1" to the user terminal, which responds with queue information in a message from the Q-server which belongs to the post office on Street 1. Then the user can say "Cashier, next turn number"in order to obtain a turn number for the queue for the post office on Street 1. The message from the user terminal 30 to the Q-server 13 is thus originally in the user's voice. The voice is interpreted and the interpretation can be carried out in the user terminal and sent as converted data, but can also be interpreted at the server side. In the latter case, a voice message is sent for interpretation further towards, or in, the Q-server 13 in order finally to become the necessary converted data which is processed for the exchange of information between the Q-server 13, the Web server 18, SC/SN 60 and/or the user terminal 30. The voice control can also take place on the server side, that is through a Network or Service Provider or, for example, through the Q-server 13 or the Web server 18. Of course, voice control via one of the units mentioned in this paragraph does not exclude voice control via any of the other units mentioned in this paragraph.

This invention is not limited to the embodiments described above, but comprises everything which is described in the patent claims. Several embodiments are possible, as different standards and systems are used for telephony, mobile telephony and data communication in different parts of the world.

List of abbreviations used

Ni=next from queue with service type i

Nj=next from queue with service type j $b_k$=operator position k $n_w$=number of people waiting $n_r$=current number (most recently served)

$t_w$=estimated waiting time $@b_k$=at operator position k

Di=display for queue with service type i

There can be several, for example one for each service type, which is indicated by Dj for service type j, or all service types combined on one display.

Ti=take turn number for queue with service type i (key)

Tj=take turn number for queue with service type j (key)

What is claimed is:

1. A system for allocating service resources to users wherein said service resources are provided to at least one service point for service at least at one associated operator positions, said system comprises:
    at least one device for managing at least one queue and queue information about the queue, said queue information, comprising at least one of a notification message, a most recently served number, an estimated waiting time, a number of people waiting, and a type of said service, and said device further comprising an input to receive a queue number;
    at least one user terminal arranged for two-way communication with the device;
    wherein the device and the user terminal are connectable to a first communication network and a second communication network wherein said first and second communication networks are connected together by at least one gateway,
    wherein the first network comprises a node for the reception and transmission of messages intended for the device or the user terminal, the second network comprises a server and the device is adapted to communicate with the server and with the node, so that the queue information is available and transmitted to the user terminal via both the first communication network and the second communication network and the device responds to calls from the user terminal.

2. A system according to claim 1, wherein the user terminal comprises at least one of a portable terminal, a mobile phone, and a personal digital communicator device.

3. A system according to claim 1, wherein the device publishes the queue information on an Internet web page via the server.

4. A system according to claim 1, wherein the device communicates with said user terminal via a WAP server.

5. A system according to claim 1, further comprising a queue information device, which displays queue information or a system where a person can be allocated a turn number and obtain a queue ticket.

6. A system according to claim 5, wherein the device and the queue information device are adapted to communicate with each other via a third communication network which comprises a wireless LAN.

7. A system according to claim 6, wherein the device and the user terminal are adapted to alternatively communicate directly with each other via the third communication network without the involvement of the first communication network and the second communication network.

8. A device arranged to manage at least one queue and queue information about the at least one queue, said queue information includes information identifying a most recently served a number and number of people waiting in said at least one queue, and said device further comprises an input to receive a queue number, the device is connectable to at least one first communication network and a second communication network connected together via at least one gateway,
    wherein the first network comprises a node for the reception and transmission of messages, to and from the device or a user terminal, the second network comprises a server such that the device communicates with the server and with the node; so that the queue information is made generally available and is transmitted to the user terminal via both the first communication network and the second communication network and the device generates messages in response to calls from the user terminal.

9. A device according to claim 8, wherein the device publishes the queue information on a web page on the Internet via the server.

10. A device according to claim 8, wherein the device is adapted to communicate with a queue information device, which displays queue information via a third communication network comprising a wireless LAN.

11. A device according to claim 8 wherein said device includes a processor executing a computer program for causing the device to perform the following steps:
    manage at least one queue and queue information said queue information identifying a most recently served a number and number of people waiting in the queue, and an input receiving a queue number,
    making the queue information generally available and transmitting the queue information to at least one user terminal.

12. A device according to claim 11, wherein said computer program further enables the device to communicate with a queue information device which displays queue information via a third communication network comprising a wireless LAN.

13. A device according to claim 11, wherein said computer program further comprises machine-readable code recorded on a recording medium accessible by said processor.

14. A method for allocating service resources to users thereof, said service resources provided at a service point for serving one or more associated operator positions, said method comprises:

from at least one user terminal communicating with a device arranged to manage at least one queue and queue information, wherein said queue information comprises a most recently served number, and a number of people waiting in said queue;

said device assigning a queue number and a unique terminal identity ($id_c$) to the at least one user terminal and said queue number and queue information are sent by the device to the user terminal assigned the unique terminal identity ($id_c$);

wherein said queue information and queue number are transmitted by the device via a node of a first communication network and a server in a second communication network, which is connected to the first communication network via a gateway, and to the user terminal;

said device further transmitting to the user terminal information identifying a queue number currently being served ($n_r$), a number of people waiting ($n_w$) in the queue and a queue identity ($id_s$); and said user terminal notifying the device of a selection may be user of the user terminal, said selection being one of accepting a turn number, specifying a desired queue number ($n_r$) and specifying a desired estimated waiting time ($t_r$).

15. A method according to claim 14, wherein the queue status messages are sent repeatedly to a group which has active electronic queue numbers with the queue identity ($id_s$).

16. A method according to claim 14, further comprising:
exchanging information between the device and a queue information device via a third network in the form of a wireless local area network (LAN).

17. A method according to claim 14, further comprising:
checking a distance between the device or the service point and the user terminal with the unique terminal identity ($id_c$).

18. A method according to claim 17, further comprising:
checking whether the distance is less than a predetermined distance changing the communication between the device and the user terminal to occur via a third communication network when the distance is less than the predetermined distance.

19. A method according to claim 17, further comprising:
determining a time when the queue information is to be sent from the device to the user terminal such that depending on a distance between the service point and the user terminal.

20. The system in claim 1 wherein the server of the second network comprise a Web server.

21. The system in claim 1 wherein the messages comprise text messages.

22. The system in claim 1 wherein the node comprises a short message service center.

23. The system in claim 1 wherein the second communication network comprises the Internet.

24. The system in claim 1 wherein said queue information comprises a plurality of said notification message, said most recently served number, said estimated waiting time, said number of people waiting, and said type of said service.

* * * * *